US005790281A

United States Patent [19]

Knox et al.

[11] Patent Number: 5,790,281
[45] Date of Patent: Aug. 4, 1998

[54] METHOD OF CORRECTING THE MEASURED REFLECTANCE OF AN IMAGE ACQUIRED BY AN IMAGE ACQUISITION DEVICE FOR THE INTEGRATING CAVITY EFFECT

[75] Inventors: Keith T. Knox, Rochester; Brian L. Waldron, Penfield, both of N.Y.

[73] Assignee: Xerox Corporation, Stamford, Conn.

[21] Appl. No.: 720,653

[22] Filed: Oct. 2, 1996

[51] Int. Cl.$^6$ .................................................. H04N 1/46
[52] U.S. Cl. ........................... 358/504; 358/509; 358/516; 358/518
[58] Field of Search ..................... 358/504, 516, 358/509, 406, 475, 461, 468, 520, 512, 514, 518, 522; 356/445, 378, 331, 334; 359/584; 250/226, 228; 362/296, 84, 298; 399/39, 52, 220, 221

[56] References Cited

U.S. PATENT DOCUMENTS

| | | | |
|---|---|---|---|
| 4,717,254 | 1/1988 | Masuda | 356/334 |
| 5,079,678 | 1/1992 | Parker | 362/84 |
| 5,095,372 | 3/1992 | Silverberg | 358/401 |
| 5,103,385 | 4/1992 | Federico et al. | 362/298 |
| 5,123,740 | 6/1992 | Giebeler, Jr. | 356/331 |
| 5,386,267 | 1/1995 | Jones | 358/484 |
| 5,422,703 | 6/1995 | Horie et al. | 356/445 |
| 5,453,849 | 9/1995 | Copenhaver et al. | 358/475 |
| 5,519,513 | 5/1996 | Copenhaver et al. | 358/475 |

OTHER PUBLICATIONS

J.E. Farrell et al., "Sources of Scanner Calibration Errors", IS&T's Eighth International Congress on Advances in Non–Impact Printing Technologies, 1992, pp. 491–495.
Joyce E. Farrel & Brian A. Wandell, "Scanner Linearity", Journal of Electronic Imaging, Jul. 1993, vol. 2(3), pp. 225–230.

Primary Examiner—Edward L. Coles
Assistant Examiner—Cheukfan Lee
Attorney, Agent, or Firm—Michelle Waites

[57] ABSTRACT

This invention discloses a method of correcting the measurement of the amount of light reflected by a document that is being processed by a digital image acquisition apparatus. A typical image acquisition apparatus measures the amount of light reflected from the surface of the original document and sets a corresponding set of electrical signals to a printing or storage module. Image acquisition usually requires illuminating the original document with a reflecting cavity, which causes the measurement of the amount of light present on the surface of the document to become distorted. The method disclosed by the present invention corrects this phenomenon by calculating the amount of light that reaches the surface of the original document by being reflected from the illumination system and the surrounding cavity. This allows the measured reflectance to be corrected, and the true reflectance to be used for subsequent output or storage.

11 Claims, 4 Drawing Sheets

METHOD OF CORRECTING THE MEASURED REFLECTANCE OF AN IMAGE ACQUIRED BY AN IMAGE ACQUISITION DEVICE FOR THE INTEGRATING CAVITY EFFECT

The present invention is directed to a method of improving the accuracy of data that has been acquired by a digital imaging device.

More specifically, the present invention is directed to a method of correcting "integrating cavity effect," a phenomenon which results in a distorted measurement of the amount of light reflected from the surface of an original document. The present invention discloses a method of correcting this phenomenon such that the measured value can be properly adjusted to account for light that is reflected from the illumination system and the surrounding cavity.

BACKGROUND OF THE INVENTION

The xerographic imaging process begins by charging a photoconductive member to a uniform potential, and then exposing a light image of an original document onto the surface of the photoconductor. Exposing the charged photoconductor to a light image discharges the surface in areas corresponding to non-image areas in the original document while maintaining the charge in image areas. This selective discharging scheme produces an electrostatic latent image of the original document on the surface of the photoconductive member. A developer material is then deposited onto the surface of the photoconductor to transform the latent image into a visible reproduction. The developer typically consists of toner particles with an electrical polarity opposite that of the photoconductive member. Thus, the toner particles are naturally drawn to the oppositely charged photoreceptor. A blank copy sheet is brought into contact with the photoreceptor and heated, thereby permanently affixing the reproduced image to the sheet. This results in a "hard copy" reproduction of the original document or image. The photoconductive member is then cleaned to remove any charge and/or residual developing material from its surface to prepare it for subsequent imaging cycles.

In a digital xerographic printing apparatus, the light is reflected from the illuminated document, through a cavity, and onto a photoelectric element. The photoelectric element divides the image into tiny dots called picture elements or "pixels," and the intensity of the light that is reflected from each pixel is transmitted as a set of electric signals. The signal representing each pixel is proportional to the amount of light present at the corresponding location on the surface of the document. If desired, the image can then be subjected to various types of image processing. The electric signals are then used to modulate a laser beam which is turned on and off in response to the signal received from the photoelectric element. The laser strikes the photoreceptor in the areas which correspond to an "on" signal, thereby eliminating the electric charge at those locations. As in any xerographic imaging process, this creates an electrostatic latent image of the original document on the surface of the photoreceptor. The latent image is developed, transferred, and fixed to a copy sheet, to result in a hardcopy reproduction of the original document.

A scanner is one type of image acquisition apparatus which reads information from an original document and transmits the data to a storage or output media. A typical scanner will have an illumination system including a light source, a set of mirrors and lenses which are placed in an appropriate configuration and mounted in a cavity, and an array of photosensitive elements which produce electrical signals in proportion to the amount of light to which they have been exposed. A platen glass usually sits on top of the cavity. The document is fed into the system, and across the platen glass as the light source is aimed at the document. The light bounces off of the document and is reflected back into the cavity toward the photosensitive elements.

Scanners may be configured such that the reflectance values of white areas of the input source will equal to one, while the reflectance of pure black areas will equal to zero. Reflectances of gray will range between zero and one, with the value approaching one as the gray gets lighter. Other ranges of reflectance are possible. For example, an eight bit scanner may have 256 reflectance values with the reflectance of pure black areas set equal to zero, the reflectance of pure white areas set equal to 255, and gray reflectances ranging between zero and 255, with the gray getting lighter as the reflectance varies from 1 to 254. In any event, the assigned reflectance value is read at each pixel in the image, and the values for the entire image are transmitted to the output or storage media as a set of electric signals. These signals are used to modulate the laser beam, turning it off when the measured reflectance is equal to zero, and turning it on at the desired intensity when the reflectance is equal to a value other than zero. Thus, the amount of light reflected from each location on the surface of the document will be dependent upon the image contained thereon.

For example, if the location being scanned represents a black area of the original image, a zero reflectance value will be assigned to the pixel corresponding to that location. An "off" signal will then be transmitted from the photosensitive element to the appropriate location in the set of electrical signals that will be used to modulate the laser beam. When the laser beam reaches the corresponding location in the output or storage media, the light will be adjusted to cause a black spot to appear at the output. Each location of the document is scanned until the entire image is represented.

During this process, some of the light that reaches the interior of the cavity will bounce off of the mirrors and the inside walls, and be reflected back onto the surface of the document. This results in additional illumination on the surface of the document, which leads to an inaccurate measurement of the reflectance values at the photosensitive array. The additional illumination causes the reproduced image to be lighter and/or darker in some areas in the reproduced image than those of the corresponding areas in the original. The present invention provides a method of correcting this measurement of the reflectance values at the surface of the document by the photosensitive array before the data is transmitted from the photosensitive element to the laser beam.

The following disclosures may be relevant to various aspects of the present invention:

U.S. Pat. No. 5,422,703 to Horie issued Jun. 6, 1995 discloses a method of measuring light reflected by a test sample with a microscopic photometric system. The test sample placed in an in-focus position of an objective is irradiated, and light reflected by the test sample is measured. Stray light generated by microscopic optics including the objective is measured with the test sample placed in an out-of-focus position of the objective. Light actually reflected by the test sample is determined from a difference between the reflected light and the stray light measured.

U.S. Pat. No. 5,123,740 to Giebeler issued Jun. 23, 1995 discloses a monochrometer having a stray light trap which substantially directs stray light away from light of wavelength of interest and/or absorb the stray light so as to substantially reduce the stray light component in the light of interest. The monochrometer has internal surfaces each having one of several optical characteristics.

U.S. Pat. No. 5,095,372 to Silverberg issued Mar. 10, 1992 discloses a combined copy machine and fax signal production device wherein the scanning system of the copy machine is employed to direct stray light from a document being scanned to a second lens, without displacing the copy lens. The second lens images the document on a linear photoreceptor array, such as a CCD. A control system produces fax signals from the output of the linear array, and may also control the scanning speed of the apparatus to be optimum for the generation of fax signals.

U.S. Pat. No. 4,717,254 to Masuda issued Jan. 5, 1988 discloses a Littrow spectroscope including a concave mirror for reflecting light from a source, a diffraction grating for further reflecting the light reflected by the mirror, the grating being made rotatable to allow the mirror to re-reflect the light therefrom, and an exit on which the light re-reflected by the mirror is focused; a stray-light suppressor in the form of a strip is disposed in front of, and horizontally in parallel with the longitudinal central axis of, the mirror.

All of the references cited herein are incorporated by reference for their teachings.

SUMMARY OF THE INVENTION

In accordance with the present invention, there is provided a method of correcting the measured reflectance of an image acquired by an image acquisition device, for the integrating cavity effect, comprising; providing initial parameters dependent upon a physical design of the image acquisition device, and a plurality of wavelengths of light sources present in the device which include (i) $f_1, f_2, f_3, \ldots f_n$, values representative of a quantity of each light source that is captured by an interior cavity of the image acquisition device and returned to a surface of the image, and (ii) $g_1(x), g_2(x), g_3(x), \ldots g_n(x)$, functions representative of a distribution of said returned light across the image; for each wavelength, measuring $M_c(x)$, which represents an amount of light reflected from the document and passing through a filter for a corresponding wavelength, said amount of light measured across a surface of the image being a function of location within the image, and converting said measured value to an electrical measured light signal; for each wavelength, determining $<M_c>$, a spatial average signal of said measured light from corresponding signals $M_c(x)$, and converting said value $<M_c>$ to an electric average measured light signal; for each wavelength, providing a value for $K_c$, a normalization constant, and converting said normalization constant to an electric normalization signal; and from said measured light signal, said average measured light signal and said normalization signal, producing a correction signal for each wavelength which represents a true reflectance $d_c(x)$ from $D_c(x)$ of said document, said true reflectance excluding illumination resulting from an integrating cavity effect.

The present invention provides significant enhancement to current image acquisition methods and apparatus by providing an accurate way to measure the reflectance of an image that has been acquired by such a device. The method may be implemented in a variety of ways, including calibration of the device, and may take place while the image is actually being acquired, or may provide a subsequent correction for data that has already been acquired.

BRIEF DESCRIPTION OF THE DRAWINGS

Other features and advantages of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a method of obtaining an accurate reproduction of an image that has been input to an image acquisition device. Specifically the present invention relates to a method of correcting "integrating cavity effect," which causes increased illumination of the surface of an original document, thereby resulting in an inaccurate determination of the light intensity of the image contained therein.

As used in the following description, the word "document" refers to any image bearing original from which copying is desired. Documents may comprise image supporting substrates, such as cut sheets of paper, transparencies or other individual pieces of flimsy material, burst or unburst computer forms forming a continuous length of material, or any image bearing substrate from which copying is desired. "Image" as used herein refers to the information on the document, for which scanning or another form of image acquisition is desired, and which will be in some manner copied to another substrate or to an electronic storage medium. "Scanning" as used hereinafter, refers to the relative movement of photosensitive devices with respect to documents for the purpose of acquiring an electronic representation of the image or information about the image.

Figure 1:
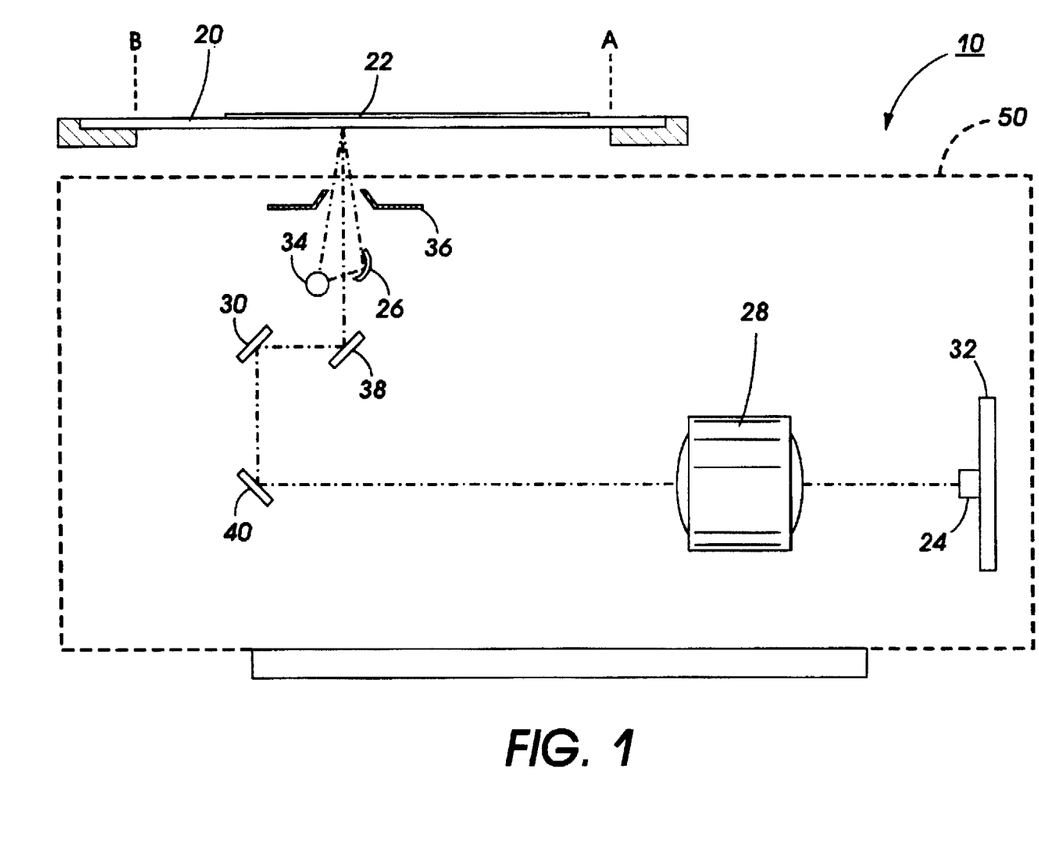
FIG. 1 is a detailed illustration showing an example configuration of an interior cavity of a monochrome image acquisition device.

Referring now to the drawings where the showings are for the purpose of describing an embodiment of the invention and not for limiting same, FIG. 1 represents one possible embodiment of a desktop scanner, the preferred embodiment of an image acquisition device which may be used with the present invention. Although the invention is described in conjunction with a desktop scanner, it may be possible to adapt it for use with other image acquisition devices, and the invention is not limited to this embodiment. A desktop scanner 10 incorporates a transparent platen 20 on which a document 22 to be copied is located. One or more photosensitive linear arrays 24 are supported for reciprocating scanning movement below platen 20. A scanning system assembly includes several optical components which move together as a single unit. These typically include a fluorescent lamp 34, an associated reflector 26 and a baffle 36, with the latter two elements cooperating to direct a narrow band of light onto a small area across the platen. Also included in the assembly are lens 28, and mirrors 30, 38 and 40, which operate together to focus the illuminated segment of platen 20 and the document being scanned thereon, onto array 24.

Array 24 produces image signals or pixels representative of the image 42 present on the surface of document 22. These pixels are output to a printer, display or storage device. The entire scanning system assembly is enclosed by cavity 50.

Scanning array 24 may be a linear array of photosensitive sensors such as CCD's or photodiodes which are controlled to sense light reflected from a document during the illumination period. The photosensitive sensors develop a charge indicative of the amount of light detected, for transmission to an image processor for use in assimilating an electronically stored representation of image 42 contained in document 22. Scanning array 24 extends in a direction transverse to that of the motion of the carriage. This enables the carriage to move along an axis known to those skilled in the art as the "slow scan" axis, which begins at one end of the image and extends in the process direction towards the opposite end. The direction across the page in which the array extends is known as the fast scan axis.

Figure 2:
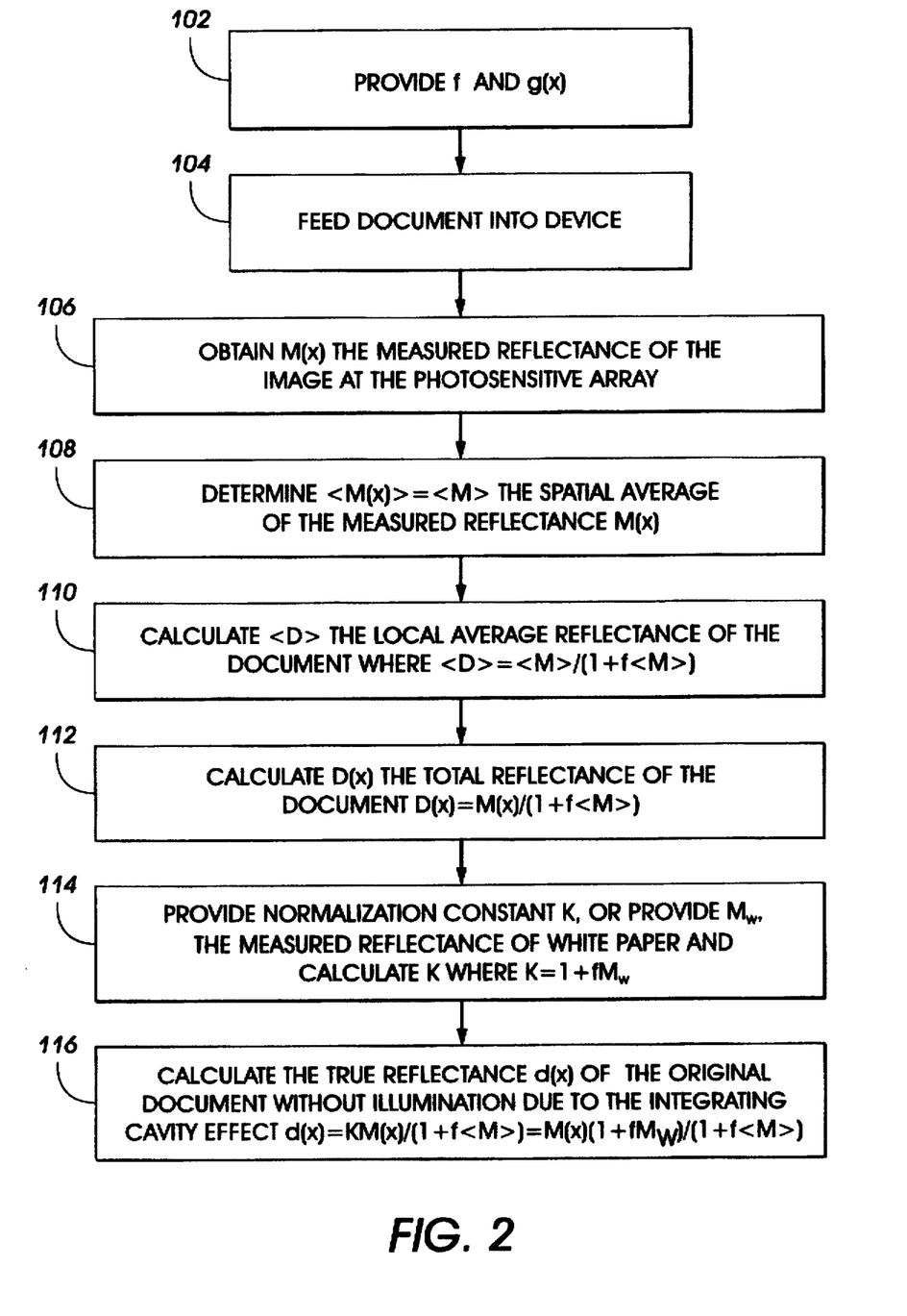
FIG. 2 is a flow chart which represents the steps for correcting the integrating cavity effect in a monochrome image acquisition device.

Referring now to FIG. 2, a mathematical model which may be used to explain the steps required for correction of the integrating cavity effect in a monochrome desktop scanner 10 is provided. This model contains several parameters which correspond to electrical responses or signals that may be measured in an image acquisition device. The true reflectance (i.e. without added illumination) $D(x)$ of any document varies across the surface of the document, and is a function of the shading or coloring contained in the image. An image acquisition device typically requires illumination of the original image as the document is fed into the machine. When an image is illuminated, some of the light from lamp 34 will shine directly upon the surface of document 22. A significant portion of the light from the lamp, not initially directed towards the document, will bounce off the reflector 26 and the other cavity walls to be redirected to the surface of the document. This additional reflection of the light from the lamp by the cavity walls and the reflector to the surface of the document is intentional because it results in the most efficient use of the total light from illuminating lamp 34.

Depending on the gradations or coloring of the image on the document, some of the light that illuminates its surface will be absorbed and some will be reflected away from the document. Array 24 is positioned to capture and measure some of this reflected light.

An unintended consequence of the cavity walls is that a portion of the reflected light that is not detected by array 24, will be captured by cavity 50 and reflector 26 and returned to the surface of the document for additional illumination. With continued reference to the flow chart of FIG. 2, the amount of this additional illumination will depend on the value of f, which is the fraction of light that is captured by illumination cavity 50 and reflector 26, and the function $g(x)$, which describes the functional form of the distribution of the additional light over document 22. This system referred to as an "integrating cavity" because of the re-illumination of the document by light that has already been reflected through the cavity.

As indicated in block 102, the value of f, the fraction of light that is captured by the illumination cavity, and the function $g(x)$, the distribution of the additional light on the document that is captured by the cavity, must be provided to initiate the process for correcting the integrating cavity effect. These values are dependent upon the layout design of the cavity of the device, and will change only if the configuration of the cavity is changed. Both f and $g(x)$ may vary with position across the document, but in the interest of simplicity, it is assumed that they remain the same across the document.

As indicated in block 104, document 22 with image 42 thereon is fed into desktop scanner 10. As image 42 moves into the device, a measurement of its reflectance $M(x)$ is made by photosensitive array 24 as shown in block 106. The value of light intensity of image 42 at a particular pixel location, as measured by the photosensitive array 24, will depend on the total illumination of document 22 at that location. As indicated above, this total illumination will contain contributions from several illumination cycles of the light onto the surface of the document, the first illumination being the light that comes directly from lamp 34, and the second illumination being that which is returned to the document after being reflected and then captured by cavity 50. Some of the light from the second illumination is then reflected away from the document, captured by the cavity and re-directed to the document to form a third illumination of the document. These multiple reflections continue for many iterations, the intensity of each iteration being smaller than that of the previous reflection, until the illumination on the document reaches equilibrium.

The value of the equilibrium illumination can be determined by summing the contributions from each individual iteration. The first illumination, i.e. the direct illumination, is assumed to be unity. The second iteration, and each subsequent iteration, will be reduced by the product of f, the fraction of light captured by the cavity, and the local average of surrounding reflectance, which is given by the convolution of the reflectance of the document, $D(x)$, with the distribution function, $g(x)$.

The equilibrium illumination of a document is given by:

$$I_{equil} = 1 + f<D> + (f<D>)^2 + (f<D>)^3 + \ldots = 1/(1-f<D>) \qquad (1)$$

where the direct illumination has been normalized to unity. The local average document reflectance $<D>$ is defined as:

$$<D> = \int g(x-x')D(x')dx' \qquad (2)$$

The weighting function $g(x)$, expresses the uniformity of the illumination across the surface of the document as well as any variation in the amount of light that reaches the cavity from different portions of the illuminated document. The function, $g(x)$, is assumed to be normalized, i.e. the integral of $g(x)$ over all space is unity. The fraction, f, of light captured by the illumination cavity may also vary at different locations on the page. The exact value of the fraction f should be expressed as a function $f(x)$ and be included in the integral in the equation for $<D>$ above, for an accurate description of the average document reflectance. In the interest of simplicity it is assumed that f remains constant across the document.

The amount of light, M, that is measured by the photosensitive array is proportional to the product of the equilibrium illumination and the reflectance of the document:

$$M(x) = D(x)/(1-f<D>) \qquad (3)$$

where $<D>$ is the local average of the true reflectance of the image. For any given document, $D(x)$ and $<D>$ are unknown quantities. What is known about $<D>$ is that it varies very slowly when compared to the function $D(x)$ In fact, at any given location x within the image, it can be assumed that $<D>$ is a constant value. As shown in block 108, this enables values for $<D>$ to be obtained by taking a spatial average of the measured reflectance $M(x)$:

$$<M(x)> = <M> = <D>/(1-f<D>) \qquad (4)$$

As indicated in block 110, the local average of the true reflectance $<D>$ is obtained by solving the above equation for $<D>$:

$$<D>=<M>/(1+f<M>) \quad (5)$$

This equation shows that the local average of the true reflectance of a document can be determined from the local average of the measured image data. The final requirement for obtaining the correction for the integrated cavity effect is shown in block 112, which is to obtain an expression for D(x) by substituting the result from equation (5) into the expression for the measured reflectance M(x) above in equation (3):

$$D(x)=M(x)/(1+f<M>) \quad (6)$$

All that remains is to normalize the calculated reflectances. The normalized reflectance, d(x), is given by including an additional proportionality constant, K, in equation (6), shown in block 114:

$$d(x)=K\,M(x)/(1+f<M>) \quad (7)$$

Several different normalization constants K are possible. For example, one way to normalize the reflectance is to scale the reflectances so that the calculated reflectance, d(x), for a white input document is equal to the uncorrected measured response of the input acquisition device for the same white input document. If the measured response to white input document is defined as $M_W$, then the constant K is given by:

$$K=(1+fM_W) \quad (8)$$

When substituted into equation (7), the final expression for the correction of integrating cavity effect, as indicated in block 116:

$$d(x)=M(x)(1+fM_W)/(1+f<M>) \quad (9)$$

Thus, equation (9) contains the expression used to correct scanned data for the integrating cavity effect, as long as the response of the acquisition device to white paper, i.e. the value of $M_W$, is known. As previously stated, the other parameters that must be known are f, the fraction of light that is captured by the illumination cavity, and the function g(x), the functional form of the distribution of this additional light over the document. Once these three parameters are known, the expression in equation (9) can be directly applied in the case of a monochrome device. Each of the parameters K, $M_W$, M(x), and <M> are values which correspond to electrical signals that may be measured in the scanner.

The signal corresponding to $M_W$ can be generated by averaging the measured values of the response of the input acquisition device to a white document of the same material or media as the targeted input document. This could be a portion of the input document that is white, rather than a separate document.

The parameter f, the fraction of light that is captured by the illumination cavity, is determined by measuring the response of the input acquisition device to large, uniform patches of different, known gray levels. One method of creating such patches is to fasten neutral density filters of known densities to white input documents. From the known densities and the measured responses, the value for the parameter f that will best fit equations (4) or (9) with the measured and known data can be obtained. An expression for g(x), the functional form of the distribution of the additional light over the document, can be obtained using use traditional edge response methods. Thus, a onedimensional black/white edge, presented to the input acquisition device, will yield a response that, when interpreted by equation (4), can permit the measurement of the functional form of g(x) using standard edge response techniques.

Again, the three parameters, $M_W$, f and g(x) are constant for a given cavity configuration and should not change unless the cavity configuration is changed. They can be measured or otherwise determined for a given input acquisition device and then used to correct subsequent input documents that are scanned, using that device, for integrating cavity effect.

A signal corresponding to parameter K is generated using equation (8), once $M_W$ and f have been provided. As indicated above, signals corresponding to M(x) are generated by measuring the reflectance of the image at the photosensitive array. The signal corresponding to <M> is generated by taking a spatial average of this measured reflectance.

Once the required correction signals are generated, expression (9) can be used to correct the acquired image to account for the integrating cavity effect. This expression may be incorporated into computer software, or source code used in any of a wide variety of computer workstations known to those skilled in the applicable arts. It may also be imbedded in an integrated circuit or otherwise implemented in hardware using standard logic circuits.

The method described for correcting the integrating cavity effect in a monochrome image acquisition device can be expanded to correct this phenomenon in a color device as long as the appropriate parameters are taken into account.

Figure 3:
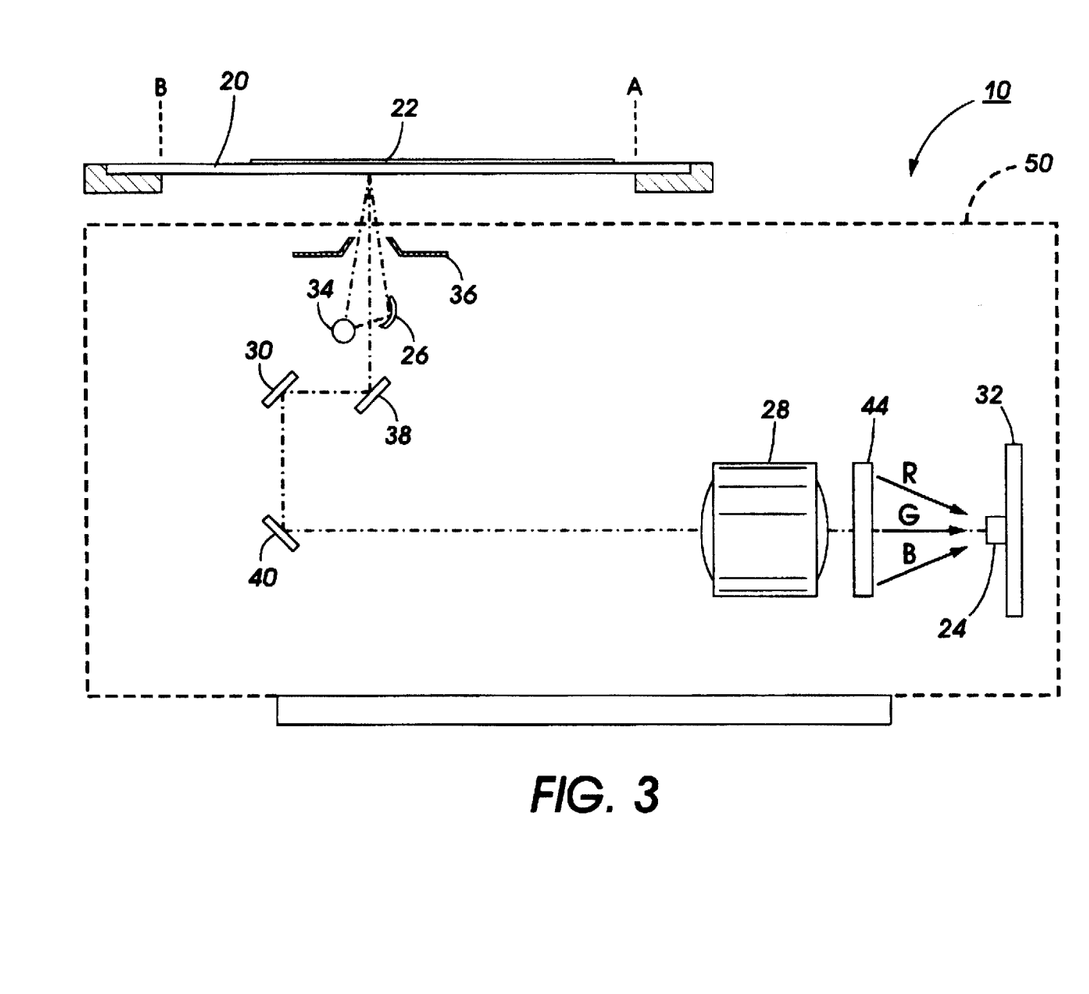
FIG. 3 is a detailed illustration showing an example configuration of an interior cavity of a color image acquisition device.

FIG. 3 shows the layout of a color scanner which may be used with the present invention. As shown, the illustration differs from the monochrome scanner depicted in FIG. 1, in that color sensor 44 is located between lens 28 and photosensitive array 24. Color imaging is typically performed using various combinations of colors, most often three colors red, green and blue. Color sensor 44 includes one filter for each color that will be used by the device for generating images. Thus, once the light from lamp 34 passes through lens 28, it will reach color sensor 44, where it will be filtered into the separate color sources. Correction of the integrating cavity effect in a color image acquisition device requires altering the expressions derived in the monochrome case, to account for each of the separate color sources. Where three colors red, green and blue are used to provide color images, this means that three values each of f, the fraction of light captured by the cavity, and $M_W$ the calibrated reflectances of white paper under the designated color, and three functions, g(x), which describe the distribution of the additional light over the document must be obtained, one for each color red, green and blue.

Figure 4:
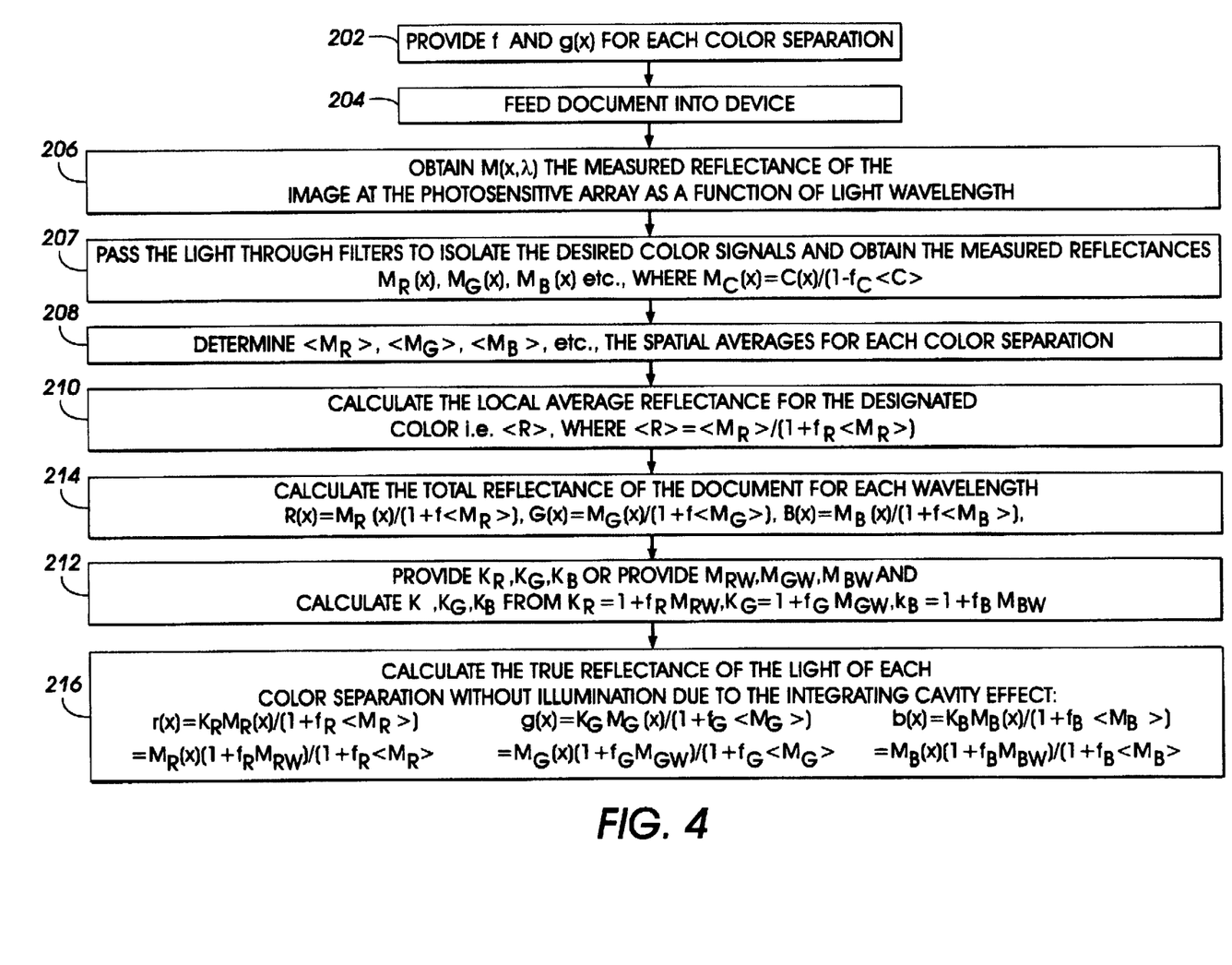
FIG. 4 is a flow chart which represents the steps for correcting the integrating cavity effect in a color image acquisition device.

Referring now to FIG. 4, the model developed to explain the steps required to correct the integrating cavity effect in a monochrome desktop scanner will be expanded to illustrate the additional considerations that must be made for correction in a color device. The appropriate parameters will again be shown to correspond to electrical signals that may be measured in the image acquisition device. The three values of $f_R$, $f_G$, and $f_B$, the fraction of light for each color separation that is captured by the illumination cavity, must be provided to initiate the process for correcting the integrating cavity effect. In addition, expressions for $g_R(x)$, $g_G(x)$, and $g_B(x)$ must be provided. Values for $M_{RW}$, $M_{GW}$, and $M_{BW}$ should be provided if the normalization constants $K_R$, $K_G$ and $K_B$ will be obtained by scaling the measured reflectances of the image acquisition device to that of white paper.

The reflectance of a color document is dependent upon the wavelengths of the various colors contained therein. For a color device, equation (3) must be modified to account for the reflectances of the different color separations. An expression for the measured value, which depends on the equilibrium level of illumination, is obtained by adding a wavelength parameter to the document reflectance, D(x), in equation (3) and to the parameter f:

$$M(x,\lambda)=D(x,\lambda)/(1-f(\lambda)<D(x,\lambda)>)) \quad (10)$$

As noted above, color scanners typically emit signals that are combinations of the three colors red, green and blue. Each color is typically present at a different channel in the scanner. The response of a single channel $M_R(x)$, $M_G(x)$, or $M_B(x)$ is obtained by determining how much color passes through each of the corresponding filters. For example, in the case of the red signal, the amount of light that passes through the red filter $F_R$ is:

$$M_R(x)=\int(F_R(\lambda)D(x,\lambda)/(1-f(\lambda)<D(x,\lambda)>))d\lambda \quad (11)$$

What is desired is a relationship between the measured reflectance, $M_R(x)$, and the true red reflectance, R(x). Under ideal conditions, when there is no integrating cavity effect present, the response of a single channel R(x), G(x), or B(x) is given by the filtered response of the document reflectance, D(x,λ). For example, the ideal red signal, R(x) is given by:

$$R(x)=\int F_R(\lambda)D(x,\lambda)d\lambda \quad (12)$$

In order to find an approximate solution to the task of relating $M_R(x)$ and R(x), three assumptions are made. The first is that the wavelengths seen by the various filters are exclusive. That is, no wavelengths seen by the green or blue signals will enter the red signal. The second assumption is that the wavelength dependence of the document reflectance is constant over the ranges of the wavelengths of the individual filters. The third assumption is that wavelength dependence of f, the fraction of light captured by the cavity, is constant over the ranges of the wavelengths of the individual filters. Once these assumptions have been made, the individual scanner separations can be expressed in terms of the true scanner signals. As shown in block 208, the reflectance of each of the three color separations by photosensitive array 24 is measured after the image is fed into desktop scanner 10. Again isolating the red signal as an example, equation (3) results in:

$$M_R(x)=R(x)/(1-f_R<R>) \quad (13)$$

After making the above assumptions, the color separations can be corrected independently using the method described above for determining the true reflectance of a monochrome image. The value, $f_R$, is the average value of f(λ) over the spectral range of the red filter. The function <R> is a slowly varying spatial average of the true reflectance that would be measured by a scanner that does not suffer from the integrating cavity effect. As shown in block 210, the local average of the true reflectance of the red signal is determined from equation (4) by obtaining a local average of the measured reflectance of the red signal:

$$<M_R(x)>=<R>/(1-f_R<R>) \quad (14)$$

Equivalent relationships for the green and blue signals are:

$$<M_G(x)>=<G>/(1-f_G<G>) \quad (14.1)$$

$$<M_B(x)>=<B>/(1-f_B<B>) \quad (14.2)$$

Following the steps in blocks 110 and 112 of the derivation completed for the monochrome case, these equations become:

$$R(x)=M_R(x)(1+f_R M_{RW})/(1+f_R<M_R>) \quad (15)$$

$$G(x)=M_G(x)(1+f_G M_{GW})/(1+f_G<M_G>) \quad (15.1)$$

$$B(x)=M_B(x)(1+f_B M_{BW})/(1+f_B<M_B>) \quad (15.2)$$

where the values $M_{RW}$, $M_{GW}$ and $M_{BW}$ are the measured responses to a white input document through the red, green and blue filters, respectively. The results shown in equations (15) are analogous to those that would be obtained by separately applying the results from the monochrome embodiment to each of the color separations.

As already explained, the above described method can be used to calibrate a monochrome or color desktop scanner. In addition, it can be used in the post-processing of digital images scanned using a desktop scanner. The method can also be used to adjust the quality of a reproduced image in a digital copier. The correction could also be built into a desktop scanner for real time processing, as long as a scanline buffer that is large enough to hold the data for the area of the page being illuminated is provided.

It is, therefore, apparent that there has been provided in accordance with the present invention, a method of correcting the measured reflectance of an image acquired by an image acquisition device for the integrating cavity effect that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of correcting the measured reflectance of an image acquired by an image acquisition device for the integrating cavity effect, the device being capable of producing light having at least one color separation, comprising:

a) supplying initial parameters which are each dependent upon a different color separation and upon a physical design of the image acquisition device, wherein said initial parameters include:
  (i) $f_1, f_2, f_3, \ldots, f_n$, values representative of a quantity of light captured by an interior cavity of the image acquisition device and returned to a surface of the image, each value being representative of a different color separation, and
  (ii) $g_1(x), g_2(x), g_3(x), \ldots, g_n(x)$, functions representative of a distribution of said returned light across the image;

b) for each color separation, measuring $M_c(x)$, which represents an amount of light reflected from a document for a corresponding separation, said amount of light measured across a surface of the image being a function of location within the image, and converting said measured value to an electrical measured light signal;

c) for each color separation, determining $<M_c>$, a spatial average signal of said measured light from corresponding signals $M_c(x)$, and converting said value $<M_c>$ to an electric average measured light signal;

d) for each color separation, providing a value for $K_c$, a normalization constant, and converting said normalization constant to an electric normalization signal; and e) from said measured light signal, said average measured light signal and said normalization signal, producing a correction signal for each color separation which represents a true reflectance $d_c(x)$ from $D_c(x)$ of said document, said true reflectance excluding illumination resulting from an integrating cavity effect.

2. A method as claimed in claim 1 wherein a single color separation is produced by the device.

3. A method as claimed in claim 1 wherein a plurality of color separations are produced by the device.

4. A method as claimed in claim 1 wherein said single color separation has a single wavelength.

5. A method as claimed in claim 1 wherein said providing step comprises:
   a) scanning a document with the image acquisition device, said document having at least one uniform blank region;
   b) receiving a signal representative of an amount of light within the color separation reflected from said uniform region which reaches a photosensitive array; and
   c) assigning a value to $K_c$ which scales said corrected signal for said blank regions such that they equal an average of said received reflectance signals for said blank regions.

6. A method as claimed in claim 5 wherein said document is entirely blank.

7. A method as claimed in claim 5 wherein said document has printed regions and blank regions.

8. A method as claimed in claim 1 used to calibrate a scanner.

9. A method as claimed in claim 1 used to post-process images acquired using a scanner.

10. A method as claimed in claim 1 used to adjust a quality of a reproduced image in a copier.

11. A method as claimed in claim 1 incorporated into a scanner for real time processing.

* * * * *